(12) United States Patent
Buchhop et al.

(10) Patent No.: US 7,756,143 B2
(45) Date of Patent: *Jul. 13, 2010

(54) PUSHING DOCUMENTS TO WIRELESS DATA DEVICES

(75) Inventors: Peter K. Buchhop, Cary, IL (US); Glenn Rodbarry, Roselle, IL (US); Krsto S. Sitar, Cicero, IL (US)

(73) Assignee: Bank of America Corporation, Charlotte, NC (US)

( * ) Notice: Subject to any disclaimer, the term of this patent is extended or adjusted under 35 U.S.C. 154(b) by 860 days.

This patent is subject to a terminal disclaimer.

(21) Appl. No.: 11/306,681

(22) Filed: Jan. 6, 2006

(65) Prior Publication Data

US 2007/0160070 A1 Jul. 12, 2007

(51) Int. Cl.
*H04L 12/28* (2006.01)
(52) U.S. Cl. .................. 370/401; 370/328; 370/338; 370/216
(58) Field of Classification Search ............... 455/455, 455/405, 414.1, 414.2, 414.3, 466; 370/401, 370/328, 338, 216
See application file for complete search history.

(56) References Cited

U.S. PATENT DOCUMENTS

| | | | |
|---|---|---|---|
| 7,130,389 B1 | 10/2006 | Rodkey et al. | |
| 7,496,183 B1 | 2/2009 | Rodkey et al. | |
| 7,519,165 B1 | 4/2009 | Rodkey et al. | |
| 2003/0084108 A1* | 5/2003 | Syed | 709/206 |
| 2004/0259553 A1* | 12/2004 | Delaney et al. | 455/445 |
| 2006/0050630 A1* | 3/2006 | Kobayashi et al. | 370/216 |
| 2006/0168095 A1* | 7/2006 | Sharma et al. | 709/217 |
| 2006/0239276 A1* | 10/2006 | Rodbarry et al. | 370/401 |

OTHER PUBLICATIONS

Kraemer, Brian, "ChannelWeb: Twitter Hit with Patent Infringement Lawsuit," Aug. 6, 2009, Everything Channel, Internet article accessed Aug. 21, 2009, from <http://www.crn.com/software/219100248.>

"Plaintiff's Original Complaint," *TechRadium, Inc.* v. *Twitter, Inc.*, Case No. 4:09-cv-02490, filed in TXSD on Aug. 4, 2009, 8 pages.

* cited by examiner

*Primary Examiner*—Ajit Patel
*Assistant Examiner*—Khai M Nguyen
(74) *Attorney, Agent, or Firm*—Michael A. Springs; Banner & Witcoff, Ltd.

(57) ABSTRACT

A system pushes documents to one or more wireless data devices. The system receives a push request from a user to push a specified document to one or more identified wireless data devices. The system then constructs a wireless gateway server request for each identified wireless data device, and the document is subsequently pushed to the devices.

20 Claims, 5 Drawing Sheets

PUSHING DOCUMENTS TO WIRELESS DATA DEVICES

FIELD OF THE INVENTION

One embodiment of the present invention is directed to wireless data devices. More particularly, one embodiment of the present invention is directed to the pushing of documents to wireless data devices.

BACKGROUND INFORMATION

Wireless data devices, such as the BlackBerry handheld device from RIM Corporation, have proliferated in recent years. The popularity of these devices is based on their ability to receive e-mail and other data remotely so that the user can always be "in touch" with the office.

Many of these devices have a "push" architecture that eliminates the hassles of the traditional "pull" devices, in which the user must periodically connect to an e-mail server to check for new messages, or click on an embedded Web link to receive data. In contrast, with a push device, e-mail messages and other data such as documents are automatically routed to the handheld device, without the active participation of the user.

In large corporate or government environments, there are typically multiple wireless gateway servers that allow for communication from networked-based applications to wireless data devices. A wireless data device is typically provisioned on only one of the multiple wireless gateway servers. The application software which pushes messages to the wireless data device must either know, or determine, which wireless gateway server to use in order to forward a message to a particular user's wireless data device.

However, due to network growth or management, the provisioning of the wireless data devices on a particular wireless gateway server may change, requiring the application software which pushes data to wireless devices to adjust accordingly. Currently, known wireless data device push applications require manual revisions to adjust for changes, which is time consuming and can introduce human error into the process.

Further, document viewing is a common function performed by users on wireless data devices. It is also common for e-mail senders to update or modify attachment documents, thereby causing the need for the sender to resend another e-mail with the updated/modified attachment. It then becomes the responsibility of the wireless device owner to delete the original e-mail with the corresponding attachment to avoid having multiple versions of documents on the wireless device.

In order to assure that a wireless data device user has the most recent version of a document within an organization, users currently have to have a bookmark on each of the individual wireless data devices that linked to a web server location somewhere in the location in order to get to the current information (i.e., to browse a page). However, if the user is out of coverage area, then the browser would not be available. Or as in an example where an emergency contact list is needed, the servers may be down due to a disaster. And if the user is relying on having e-mails sent each time the emergency contact list is updated, the contacts may be out of sync.

Based on the foregoing, there is a need for a system and method for automatically adjusting for changes in the mapping/provisioning of wireless data devices to wireless gateway servers and for facilitating the automatic pushing of documents to the wireless data devices.

SUMMARY OF THE INVENTION

One embodiment of the present invention is a system that pushes documents to one or more wireless data devices. The system receives a push request from a user to push a specified document to one or more identified wireless data devices. The system then constructs a wireless gateway server request for each identified wireless data device, and the document is subsequently pushed to the devices.

DETAILED DESCRIPTION

One embodiment of the present invention is a wireless data device system and application that, based on request from a user, pushes a document to a selected wireless data device.

Figure 1:
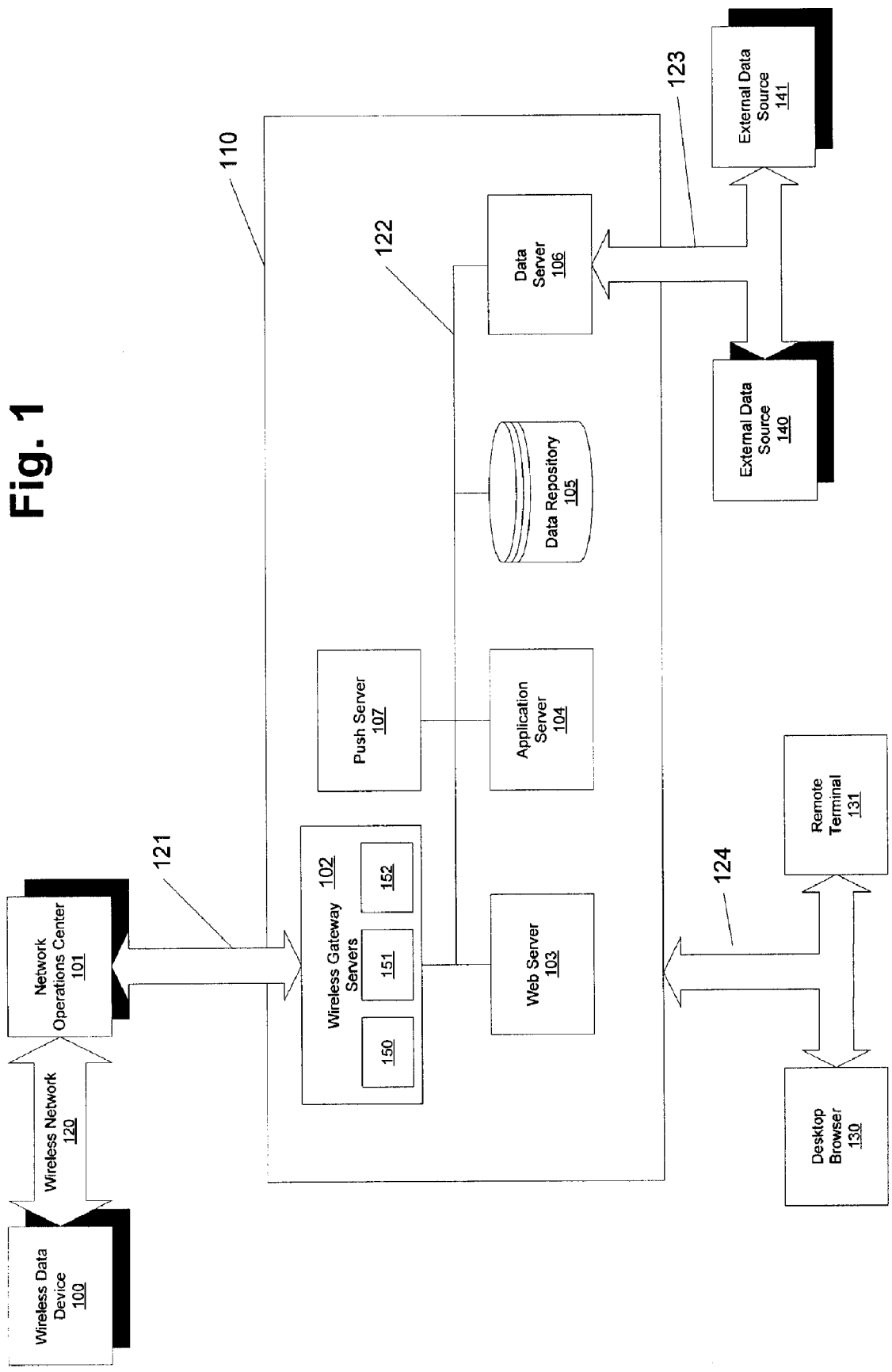
FIG. 1 is a block diagram of the functional elements of a system for pushing documents to wireless data devices in accordance with one embodiment of the present invention.

FIG. 1 is a block diagram of the functional elements of a system 110 for pushing documents to wireless data devices in accordance with one embodiment of the present invention. The functional elements shown in FIG. 1 can be implemented with any combination of hardware or software, including software executed by multiple computer systems or servers.

System 110 includes a wireless gateway 102 that includes one or more wireless gateway servers 150-152 that take electronic information produced by system 110 and makes it compatible for transmission across a wireless network 120 by encoding it in transmission protocols applicable to wireless network 120. Wireless gateway servers 150-152 communicate this electronic data to a network operations center 101 across a communications network 121. Network operations center 101 monitors and manages various computer systems which interface to a carrier's wireless network 120. The wirelessly transmitted electronic information is received and displayed by a wireless data device(s) 100.

In one embodiment, wireless data device 100 is a BlackBerry handheld device from RIM Corporation, and wireless gateway servers 150-152 are BlackBerry Enterprise Servers executing Mobile Data Service. However, other types of wireless data devices and gateway servers can be used in different embodiments of the present invention.

System 110 further includes a Web server 103 that in one embodiment includes multiple web servers and one or more load balance servers. Web server 103 receives and interprets electronic messages encoded in various internet-compatible protocols, such as HyperText Transfer Protocol ("HTTP") or File Transfer Protocol ("FTP").

An application server 104 includes one or more application programs running on one or more application servers in a clustered environment. Application server 104 contains business rules and program logic, responds to user requests and processes and formats data in a manner consistent with wireless data device 100.

System 110 further includes a push server 107 that optimizes the use of multiple wireless gateway servers 150-152 and responds to requests to push documents to selected wireless devices. In one embodiment, the number of wireless data devices 100 in communication with wireless gateway servers 150-152 can number in the thousands, and each are provisioned on a particular wireless gateway server from the set of multiple wireless gateway servers 150-152. In one embodiment, the functionality of push server 107 may be provided on the same server as application server 104, or may exist on servers which are distinct from application server 104.

A data repository 105 provides long-term data storage for system 110. The storage may take the form of relational or hierarchical databases, sequential flat file storage, or any other method that allows data to be stored and retrieved.

A data server 106 allows system 110 to interface with one or more independent external data sources 140 and 141 that provide raw data or processed information, via a communications network 123. External data source systems 140 and 141 may represent computer data systems such as 3rd party financial or market data systems, news services, or any other source of electronic data that may be transformed and represented in a wireless markup language format or other format for display on wireless data device 100. In one embodiment, the electronic pushed data is formatted in accordance with the "Push Access Protocol" of the "Wireless Application Protocol".

A desktop computer browser 130 or remote terminal 131 in one embodiment can be used to dynamically manage various system 110 elements via a communications link 124. These management functions can include viewing and altering configuration values for system 110 elements or viewing of diagnostic files or real-time data and statistics. Desktop computer browser 130 or remote terminal 131 is further utilized by a user to access a "push document" web page from web server 103 that allows the user to request a document be pushed to a wireless data device user.

Communications networks 121, 122, 123, and 124 may be one or more hardwired digital or analog communications links, wireless digital or analog communications links, or any combination thereof, or utilize any other methods for establishing and operating communications links.

In one embodiment of system 110, data can be received by wireless data device 100 in two ways: (1) "pull", which involves the user explicitly requesting the data by, for example, clicking on a link in a microbrowser; and (2) "push", which involves the user registering to receive data to be sent in the future. With push, the data is delivered to wireless data device 100 without further intervention by the user. The data may be automatically gathered and sent on a regularly scheduled or sporadic basis or it may be published by human intervention and sent to registered users on a regular or sporadic basis.

In order for wireless data device 100 to receive pushed data, in one embodiment it is provisioned on one of wireless gateway servers 150-152. The wireless gateway server takes data intended for wireless data device 100 (identified by a unique identifying number or identifier, sometimes called a "PIN") from, for example, data server 106, and forwards the data and PIN to network operations center 101. Network operations center 101 then handles transmitting the message over wireless network element 120 to the wireless data device 100 that matches the PIN.

In an embodiment where wireless data device 100 is provisioned on a single, particular wireless gateway server 150-152, push server 107 has to either know or determine which of wireless gateway servers 150-152 to forward a message to for a particular user's PIN. To facilitate this knowledge, push server 107 maintains a PIN/wireless gateway server map that maps each PIN to its respective gateway server.

In operation, a user registers to receive data to be published and delivered in the future. Registration can occur by the user submitting a request to application server 104 via wireless data device 100. Application server 104 stores what data the user wishes to receive, as well as the matching PIN for wireless data device 100, in data repository 105.

For multiple reasons, the assignment of a wireless data device to one particular wireless gateway server 150-152 of wireless gateway 102 may change. For example, one of wireless gateway servers 150-152 may change because the server becomes non-responsive to service requests, its name is changed by network administrators, it is removed from service, or a new wireless gateway server could be added to wireless gateway 102 due to capacity issues.

Figure 2:
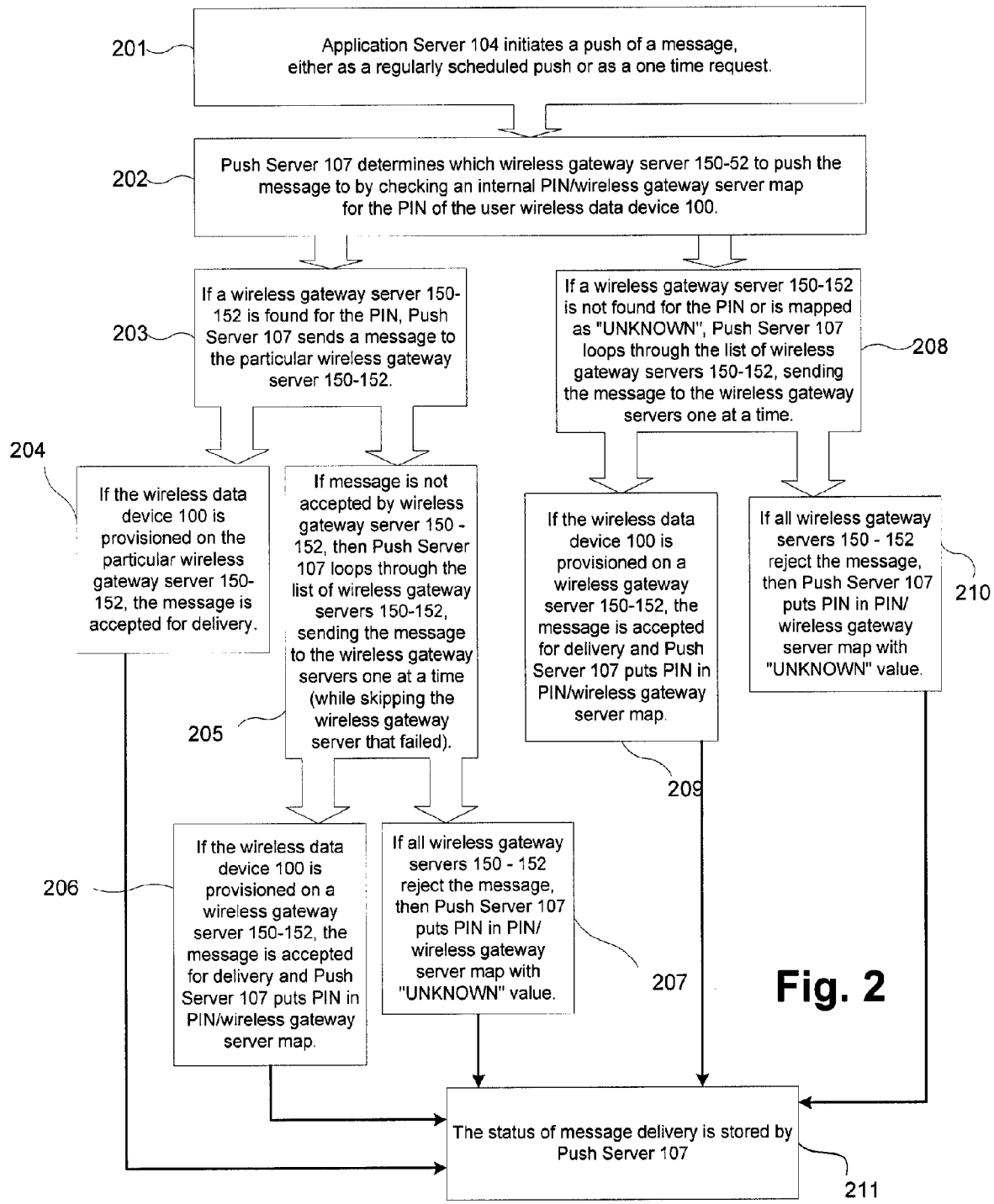
FIG. 2 is a flow diagram of the functionality performed by the system to respond to changes in the mapping of wireless data device PINs to wireless gateway servers in accordance with one embodiment of the present invention.

FIG. 2 is a flow diagram of the functionality performed by system 110 to respond to changes in the mapping of wireless data device PINs to the wireless gateway servers 150-152 in accordance with one embodiment of the present invention. In one embodiment, the functionality is implemented by software stored in memory and executed by a processor. In other embodiments, the functionality can be performed by hardware, or any combination of hardware and software.

201: Application server 104 initiates a push of data, such as a document in the form of a message, either as a regularly scheduled push or as a one time request, by sending a push request to push server 107 using communication link 122.

202: Push server 107 determines which wireless gateway server 150-152 of wireless gateway 102 to push the message to by querying/searching the PIN/wireless gateway server map for the PIN and corresponding gateway server mapping of wireless data device 100.

203: If a wireless gateway server 150-152 is found for the PIN, push server 107 sends a message to the mapped wireless gateway server using communication link 122.

204: If the wireless data device 100 is provisioned on the mapped wireless gateway server 150-152, then the message is accepted for delivery to the wireless data device 100 and the process is done. System 110 determines that the message was successfully accepted in one embodiment by receiving a status code of success on the message submission.

205: If the push of the message is not accepted by the mapped wireless gateway server 150-152, then push server 107 loops through the list of wireless gateway servers 150-152 of wireless gateway 102 by sending the message to each of the servers 150-152 one at a time, while skipping the server that failed at the beginning of block 205.

206: If the wireless data device 100 is provisioned on a wireless gateway server 150-152, the message is accepted for delivery and push server element 107 updates the PIN/wireless gateway server map with the correct gateway server for the PIN. System 110 determines that the message was successfully accepted in one embodiment by receiving a status code of success on the message submission. This function provides system 110 with an automated recovery from wireless data device 100 provisioning from one wireless gateway server to another in wireless gateway 102.

207: If all wireless gateway servers 150-152 reject the message, then push server 107 updates the PIN/wireless gateway server map with an "UNKNOWN" value for the server corresponding to the PIN of wireless data device 100.

208: If a wireless gateway server 150-152 in wireless gateway 102 is not found for the PIN, push server 107 loops through the list of wireless gateway servers 150-152, sending the message to the wireless gateway servers one at a time.

209: If the wireless data device 100 is provisioned on a wireless gateway server 150-152, the message is accepted for delivery and push server 107 updates the PIN/wireless gateway server map with the correct gateway server for the PIN. System 110 determines that the message was successfully accepted in one embodiment by receiving a status code of success on the message submission. This function provides system 110 with automated detection of a new wireless data device 100 being provisioned for the first time on a wireless gateway server 150-152 in wireless gateway 102.

210: If all wireless gateway servers 150-152 reject the message, then push server 107 updates the PIN/wireless gateway server map with an "UNKNOWN" value for the server corresponding to the PIN of wireless data device 100.

211: The status of the message delivery is stored by Push Server 107 in data repository 105 for future use of applications.

Through the use of the PIN/wireless gateway server map, the correct wireless gateway server 150-152 for a PIN is more likely to be chosen by push server 107, thereby optimizing pushes of data to wireless data device 100. Further, changes in server assignments are self-correcting by system 110 through the automated updates of the PIN/wireless gateway server map.

In one embodiment of the invention, at any point before a scheduled or sporadic push of data, a system administrator may dynamically update the list of valid wireless gateway servers 150-152 that make up wireless gateway 102 by using desktop browser 130 or remote terminal 131. The list of valid wireless gateway servers may be stored in computer volatile memory on push server 107 for optimized retrieval, as well as in data repository 105 to span shutdowns of push server 107.

Figure 3:
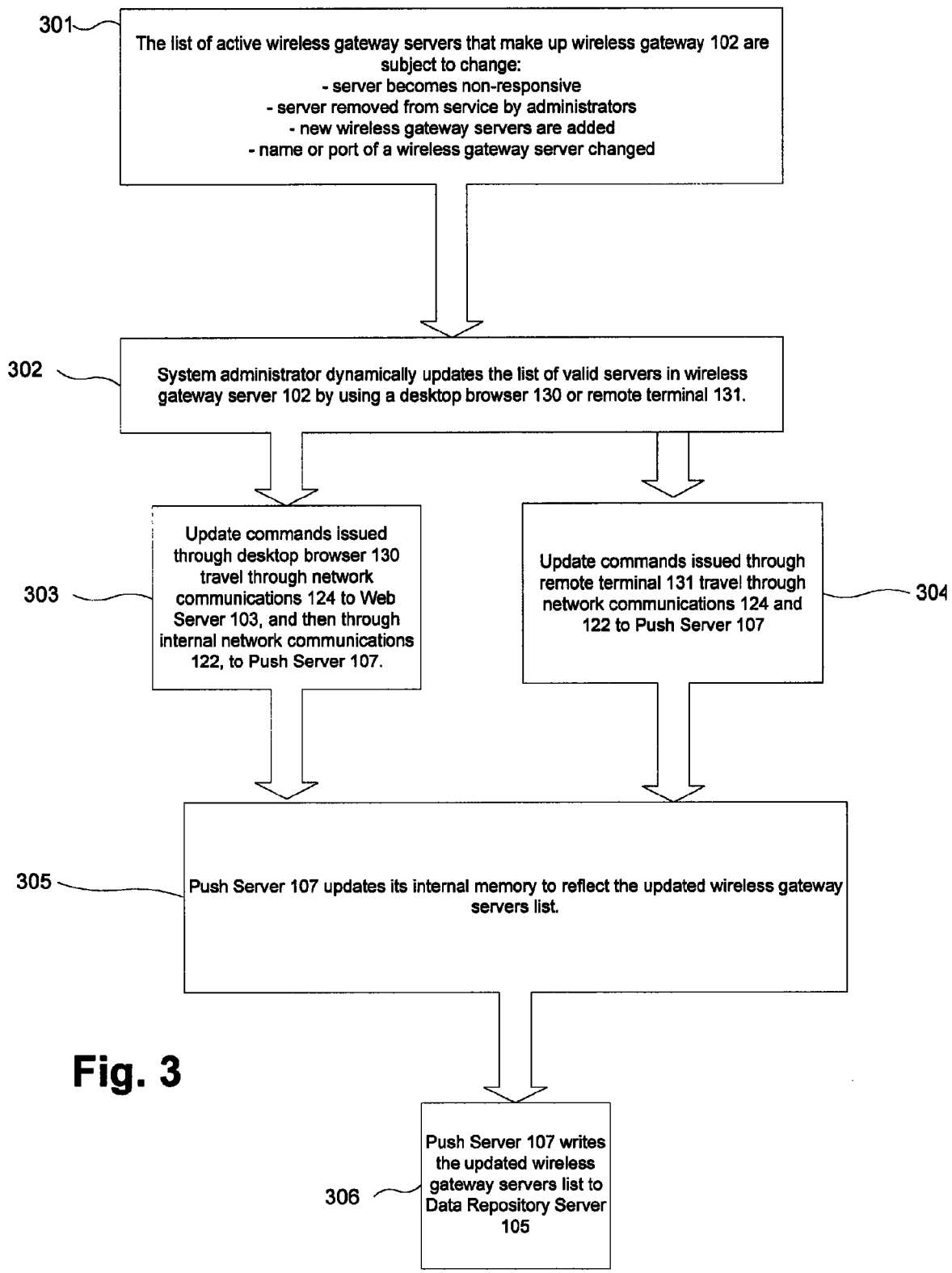
FIG. 3 is a flow diagram of the functionality performed by the system to respond to changes in wireless gateway in accordance with one embodiment of the present invention.

Dynamic maintenance of the list of valid wireless gateway servers that make up wireless gateway 102 avoids service disruptions of system 110 due to wireless gateway server name changes, additions and removals. FIG. 3 is a flow diagram of the functionality performed by system 110 to respond to changes in wireless gateway 102 in accordance with one embodiment of the present invention. In one embodiment, the functionality is implemented by software stored in memory and executed by a processor. In other embodiments, the functionality can be performed by hardware, or any combination of hardware and software.

301: The list of wireless gateway servers 150-152 of wireless gateway 102 may change. For example, one of wireless gateway servers 150-152 may change because the server becomes non-responsive, the server is removed from service or a new wireless gateway server could be added to wireless gateway 102 due to capacity issues, or the name or port of a wireless gateway server may change.

302: A system administrator dynamically updates the list of valid servers in wireless gateway 102 by using desktop browser 130 or remote terminal 131.

303: Update commands issued through desktop browser 130 travel through network communications 124 to Web server 103, and then through network communications 122, to push server 107.

304: Update commands issued through remote terminal 131 travel through network communications 124 and 122 to push server 107.

305: Push server 107 updates its internal memory to reflect the updated wireless gateway servers list.

306: Push server 107 writes the updated wireless gateway servers list to data repository 105.

Figure 4:
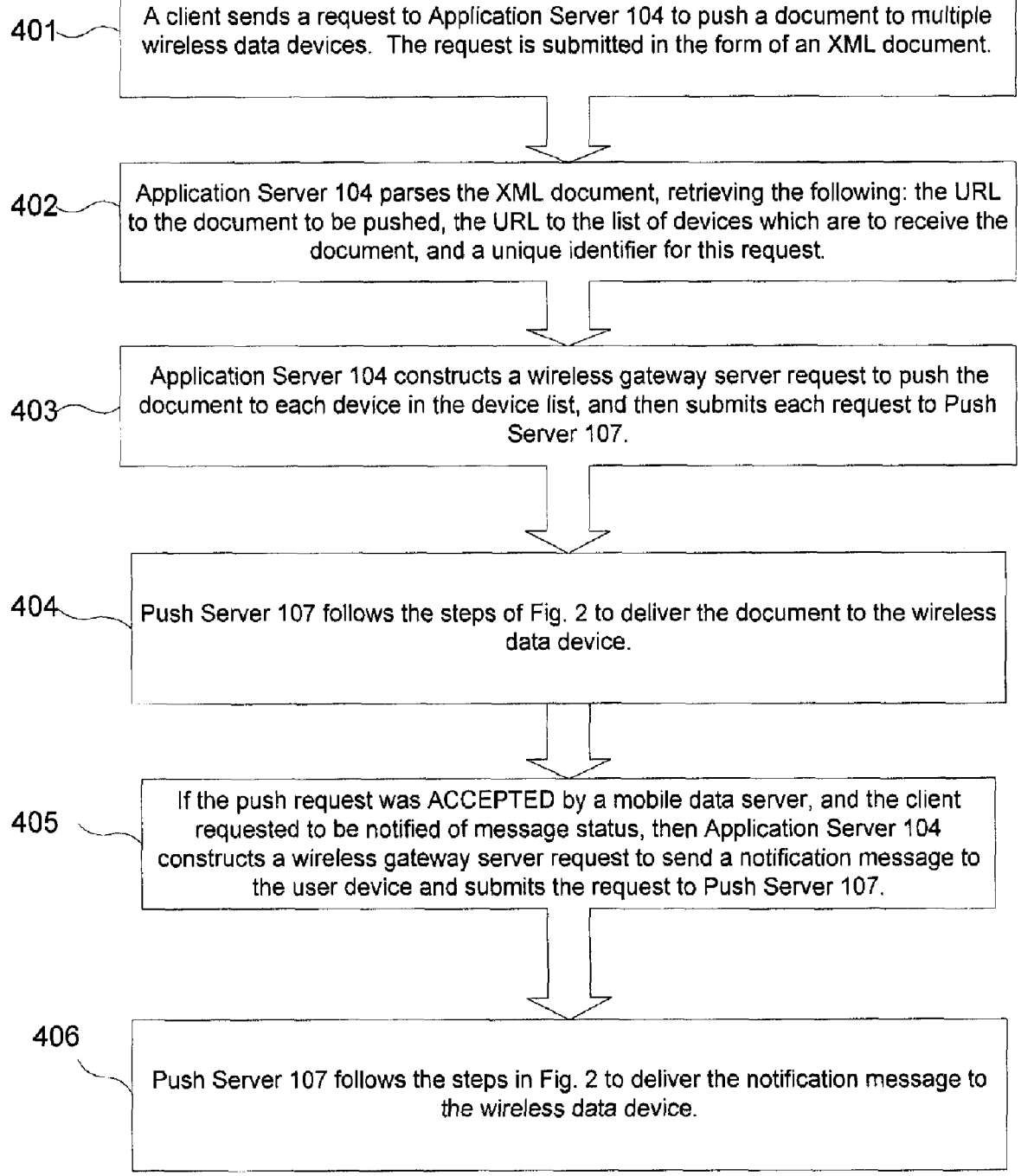
FIG. 4 is a flow diagram of the functionality performed by the system in response to a request to push a document to one or more wireless data devices in accordance with one embodiment of the present invention.

FIG. 4 is a flow diagram of the functionality performed by system 110 in response to a request to push a document to one or more wireless data devices in accordance with one embodiment of the present invention.

401: A client sends a request to application server 104 to push a document to multiple user devices. In one embodiment, the "client" is a user that accesses a web page at web server 103 via desktop browser 130. The web page provides an interface for the user that allows a user to request the delivery of the document, and provides delivery options for the user. Web server 103 then forms the request that is sent to application server 104. In another embodiment, the "client" is an application that directly forms and sends the request to application server 104. In one embodiment, the request is submitted in the form of an Extensible Markup Language ("XML") document.

In one embodiment, the types of documents that can be pushed to wireless data devices 100 includes Wireless Markup Language ("WML"), HyperText Markup Language ("HTML"), Extensible HTML, text documents, or any other type of document that is capable of being displayed on wireless data devices 100.

402: Application server 104 parses the XML request document and retrieves the following: the Uniform Resource Locator ("URL") to the document to be pushed, the URL to the list of wireless data devices which are to receive the document, and a unique identifier for this request. In another embodiment, the document to be pushed and the list of devices to receive the document are stored in data repository 105, or in some other storage location, by the client. In this embodiment, application server 104 directly accesses this information from the storage location, rather than having to parse the XML request.

403: Application server 104 constructs a wireless gateway server request to push the document to each device in the device list, and then submits each request to push server 107.

404: Push server 107 follows the steps shown in FIG. 2 to deliver the document to the wireless data device(s) 100. In one embodiment, referred to as "channel push", the user of the wireless data device is alerted that the document has been delivered by an icon that appears on the user's "desktop". The user can select the icon to read the document, which opens up the document in the user's browser. Once the icon is selected, the icon changes appearance to reflect a "read" state. In another embodiment, referred to as "message push", the document is delivered as an attachment to an e-mail. The e-mail queue may include a symbol indicating that a document or web content is attached to the e-mail. The client may choose a delivery method, such as channel push or message push, as part of the request at step 401.

405: If the push request was accepted (as indicated by step 211 of FIG. 2) by a wireless gateway server, and the client requested to be notified of the message status at step 401, then application server 104 constructs a wireless gateway server request to send a notification message to the wireless data device and submits the request to push server 107.

406: Push server 107 follows the steps shown in FIG. 2 to deliver the notification message to the wireless data device(s).

In another embodiment, referred to as "instant message" push, at step 401 the request includes a simple text message and the PIN of the wireless data device which is to receive the message. Application server 104 then creates a WML document which contains the simple text message. Push server 107 then delivers the document as described above.

In yet another embodiment, referred to as "browser cache" push, based on a request at step 401, a copy of the document is pushed to a browser cache in wireless data device(s) 100. The document may be a web page that is continuously updated, such as a web page having stock quotes. When the user of the wireless data device 100 browses the web page, the updated web page that is stored in the user's browser cache will be automatically opened, thus providing the updated information to the user without requiring the user to request such information.

Figure 5:
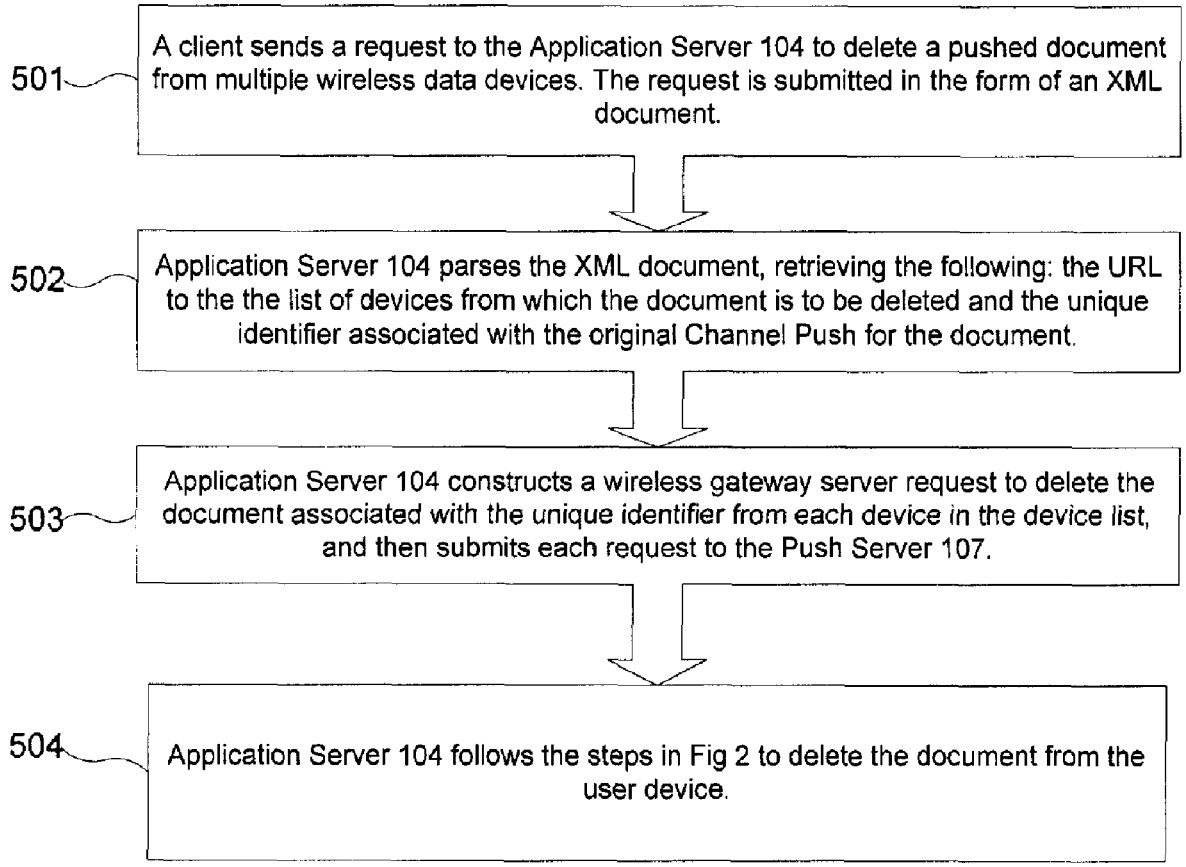
FIG. 5 is a flow diagram of the functionality performed by the system to delete a document that had previously been pushed to a wireless data device in accordance with one embodiment of the present invention.

FIG. 5 is a flow diagram of the functionality performed by system 110 to delete a document that had previously been pushed to a wireless data device, using methods discussed above, in accordance with one embodiment of the present invention.

501: A client sends a request to application server 104 to delete a pushed document from multiple wireless data devices. The request is submitted in the form of an XML document.

502: Application server 104 parses the XML document and retrieves the following: the URL to the list of devices from which the document is to be deleted and the unique identifier associated with the original channel push for the document.

503: Application server 104 constructs a wireless gateway server request to delete the document associated with the unique identifier from each device in the device list, and then submits each request to push server 107.

504: Application server 104 follows the steps in FIG. 2 to delete the document from the user device. In one embodiment, the associated icon is also deleted.

As described, embodiments of the present invention dynamically maintain a mapping of PIN/wireless gateway server so that an application can optimally push data to the correct server for a selected PIN. Pushes of data are thus more efficient and user intervention is not required to account for changes in mapping. Further, documents are easily pushed to wireless data devices through the use of simple requests via a web page or automatically through applications.

Embodiments of the present invention eliminate the need for the wireless data device owner to "manage" multiple versions of a document. It allows the wireless data device owner to maintain a current version of the document because updated/modified versions are replaced on the device without user intervention—the "push" happens automatically. Moreover, if the wireless data device user leaves a service area, the user can be assured that they have the latest copy of the document provided they were in coverage when the document was last submitted. The document will always be up to date without the user even knowing that it has been changed. Additionally, the push can be targeted to automatically update the document on all wireless data devices to which it was originally sent without any intervention required on the part of the wireless data device owner.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of pushing a document to at least one wireless data device comprising:
   receiving a push request to push the document to the wireless data device; and
   constructing a first wireless gateway server request for the wireless data device based on the push request, said constructing step comprising:
   receiving an identifier for the wireless data device;
   determining a first gateway server of a plurality of gateway servers by querying mapping data, wherein the first gateway server corresponds to the identifier;
   submitting a request to push the document to the wireless data device via the first gateway server;
   after the first gateway server receives the request to push the document to the wireless data device, if the first gateway server rejects the request to push data to the wireless data device, repeatedly submitting the request to push the document to the wireless data device via a next gateway server of the plurality of gateway servers until the next gateway server accepts the request to push the document to the wireless data device; and
   updating the mapping data for the identifier with a second gateway server if the request to push the document to the wireless data device was accepted by the next gateway server, wherein the second gateway server is the next gateway server that accepted the request to push the document to the wireless data device.

2. The method of claim 1, wherein the push request comprises:
   an identifier of the wireless data device; and
   a location for the document.

3. The method of claim 2, wherein the location is a Uniform Resource Locator.

4. The method of claim 2, wherein the location is a local storage location.

5. The method of claim 2, wherein the push request is an Extensible Markup Language document.

6. The method of claim 2, further comprising sending a notification request to the wireless data device.

7. The method of claim 6, further comprising:
   receiving a delete request to delete the document from the wireless data device; and
   constructing a second wireless gateway server request to delete the document based on the delete request.

8. The method of claim 1, wherein the push request causes the document to be placed on a desktop of the wireless data device as an icon.

9. The method of claim 1, wherein the push request causes the document to be attached to an e-mail sent to the wireless data device.

10. The method of claim 1, wherein the push request causes the document to be stored in a browser cache on the wireless data device.

11. Non-transitory computer readable medium having instructions stored thereon that, when executed by a processor, cause the processor to:
   receive a push request to push a document to a wireless data device; and
   construct a first wireless gateway server request for the wireless data device based on the push request, wherein said instructions further causing said processor to:
   receive an identifier for the wireless data device;
   determine a first gateway server of a plurality of gateway servers by querying mapping data, wherein the first gateway server corresponds to the identifier; submit a request to push the document to the wireless data device via the first gateway server;

after the first gateway server receives the request to push the document to the wireless data device, if the first gateway server rejects the request to push data to the wireless data device, repeatedly submitting the request to push the document to the wireless data device via a next gateway server of the plurality of gateway servers until the next gateway server accepts the request to push the document to the wireless data device; and update the mapping data for the identifier with a second gateway server if the request to push the document to the wireless data device was accepted by the next gateway server, wherein the second gateway server is the next gateway server that accepted the request to push the document to the wireless data device.

12. Non-transitory computer readable medium of claim 11, wherein the push request comprises: an identifier of the wireless data device; and a location for the document.

13. Non-transitory computer readable medium of claim 12, wherein the location is a Uniform Resource Locator.

14. Non-transitory computer readable medium of claim 12, wherein the location is a local storage location.

15. Non-transitory computer readable medium of claim 12, wherein the push request is an Extensible Markup Language document.

16. Non-transitory computer readable medium of claim 12, said instructions further causing said processor to send a notification request to the wireless data device.

17. Non-transitory computer readable medium of claim 16, said instructions further causing said processor to:
   receive a delete request to delete the document from the wireless data device; and
   construct a second wireless gateway server request to delete the document based on the delete request.

18. Non-transitory computer readable medium of claim 11, wherein the push request causes the document to be placed on a desktop of the wireless data device as an icon.

19. Non-transitory computer readable medium of claim 11, wherein the push request causes the document to be attached to an e-mail sent to the wireless data device.

20. Non-transitory computer readable medium of claim 11, wherein the push request causes the document to be stored in a browser cache on the wireless data device.

* * * * *